(12) United States Patent
Tokizawa

(10) Patent No.: US 9,419,484 B2
(45) Date of Patent: Aug. 16, 2016

(54) STATOR FOR ROTATING ELECTRIC MACHINE

(71) Applicant: DENSO CORPORATION, Kariya, Aichi-pref. (JP)

(72) Inventor: Takashi Tokizawa, Nagoya (JP)

(73) Assignee: DENSO CORPORATION, Kariya (JP)

( * ) Notice: Subject to any disclaimer, the term of this patent is extended or adjusted under 35 U.S.C. 154(b) by 248 days.

(21) Appl. No.: 14/230,528

(22) Filed: Mar. 31, 2014

(65) Prior Publication Data

US 2014/0300237 A1    Oct. 9, 2014

(30) Foreign Application Priority Data

Apr. 8, 2013   (JP) ................................ 2013-080318

(51) Int. Cl.
| | |
|---|---|
| *H02K 3/04* | (2006.01) |
| *H02K 3/12* | (2006.01) |
| *H02K 15/04* | (2006.01) |
| *H02K 3/34* | (2006.01) |
| *H02K 15/00* | (2006.01) |

(52) U.S. Cl.
CPC .................. *H02K 3/12* (2013.01); *H02K 3/345* (2013.01); *H02K 15/0081* (2013.01); *H02K 15/04* (2013.01); *H02K 2213/03* (2013.01)

(58) Field of Classification Search
CPC ....... H02K 15/085; H02K 15/04; H02K 3/04; H02K 3/28; H02K 15/081; H02K 3/12
USPC .................................................. 310/208, 184
See application file for complete search history.

(56) References Cited

U.S. PATENT DOCUMENTS

| | | | | |
|---|---|---|---|---|
| 6,181,043 | B1 * | 1/2001 | Kusase ..................... | H02K 3/12 310/180 |
| 6,403,921 | B1 | 6/2002 | Maeda et al. | |
| 6,459,177 | B1 * | 10/2002 | Nakamura ............... | H02K 3/12 310/201 |
| 6,490,779 | B1 | 12/2002 | Tokizawa et al. | |

(Continued)

FOREIGN PATENT DOCUMENTS

| | | |
|---|---|---|
| JP | A-2000-350422 | 12/2000 |
| JP | A-2002-10585 | 1/2002 |

(Continued)

OTHER PUBLICATIONS

May 12, 2015 Office Action issued in Japanese Patent Application No. 2013-080318.

*Primary Examiner* — Joshua Benitez-Rosario
*Assistant Examiner* — Leda Pham
(74) *Attorney, Agent, or Firm* — Oliff PLC

(57) ABSTRACT

A stator includes an annular stator core and a stator coil. The stator coil is formed of electric conductor segments each of which is bent in its thickness direction to include, at least, an in-slot portion and an oblique portion. The in-slot portion is received in a corresponding slot of the stator core with its width direction coinciding with a radial direction of the stator core. The oblique portion protrudes from the in-slot portion outside the corresponding slot and extends, over its entire length, along the circumferential direction of the stator core obliquely with respect to an axial end face of the stator core. The oblique portion includes a thick section on the proximal side and a thin section on the distal side. Each corresponding pair of the oblique portions of the electric conductor segments are connected by joining the thin sections of the oblique portions.

5 Claims, 8 Drawing Sheets

(56) References Cited

U.S. PATENT DOCUMENTS

| | | |
|---|---|---|
| 2002/0046779 A1 | 4/2002 | Even |
| 2003/0024101 A1 | 2/2003 | Tokizawa et al. |
| 2008/0191574 A1* | 8/2008 | Tokizawa ............ H02K 3/12 310/179 |
| 2011/0041320 A1 | 2/2011 | Tokizawa |
| 2012/0319522 A1 | 12/2012 | Ikeda |
| 2013/0300246 A1 | 11/2013 | Kaimori et al. |
| 2014/0183985 A1 | 7/2014 | Kurahara et al. |

FOREIGN PATENT DOCUMENTS

| | | |
|---|---|---|
| JP | 2004-254368 A | 9/2004 |
| JP | 2007-037344 A | 2/2007 |
| JP | A-2008-199751 | 8/2008 |
| JP | 2010-141967 A | 6/2010 |
| JP | A-2012-139075 | 7/2012 |
| JP | A-2012-222874 | 11/2012 |
| JP | A-2012-222922 | 11/2012 |
| JP | 2013-005609 A | 1/2013 |
| JP | 2013-021896 A | 1/2013 |

* cited by examiner

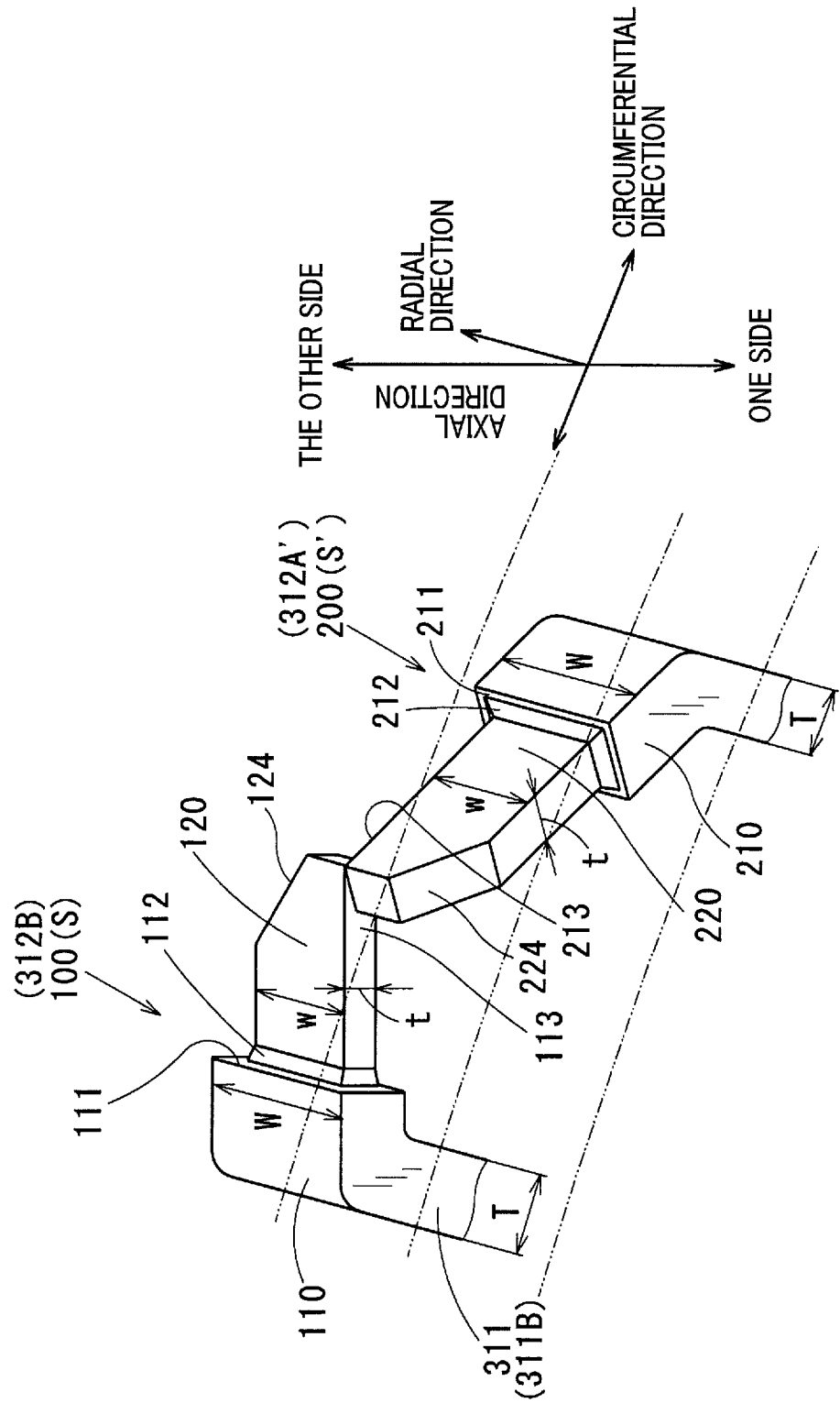

STATOR FOR ROTATING ELECTRIC MACHINE

CROSS-REFERENCE TO RELATED APPLICATION

This application is based on and claims priority from Japanese Patent Application No. 2013-80318 filed on Apr. 8, 2013, the content of which is hereby incorporated by reference in its entirety into this application.

BACKGROUND

1 Technical Field

The present invention relates generally to stators for rotating electric machines that are used in, for example, motor vehicles as electric motors (e.g., high-voltage and high-output motors) and electric generators (e.g., alternators). More particularly, the present invention relates to an improved structure of a stator coil that is formed by joining a plurality of electric conductor segments mounted on an annular stator core.

2 Description of Related Art

Conventionally, stator coils that are formed of electric conductor segments with a rectangular cross-sectional shape have been widely used in rotating electric machines, such as automotive alternators. More specifically, those stator coils are generally formed by: inserting the electric conductor segments in corresponding slots of an annular stator core; and joining corresponding pairs of end portions of the electric conductor segments by welding, the end portions protruding outside the corresponding slots from an axial end face of the stator core. With the above manufacturing method, it is possible to secure high space factors of the electric conductor segments in the corresponding slots of the stator core and make coil ends of the stator coil (i.e., those parts of the stator coil which protrude outside the slots of the stator core) small in size.

Moreover, Japanese Unexamined Patent Application Publication No. 2000-350422 discloses a stator coil that is formed of substantially U-shaped electric conductor segments. Each of the electric conductor segments includes a pair of straight portions and a turn portion that connects ends of the straight portions on the same side. In forming the stator coil, the straight portions are first respectively inserted in corresponding slots of an annular stator core so that parts of the straight portions protrude outside the corresponding slots from an axial end face of the stator core. Then, the protruding parts of the straight portions are bent so as to extend along the circumferential direction of the stator core obliquely with respect to the axial end face of the stator core. Thereafter, corresponding pairs of the protruding parts of the electric conductor segments are joined by welding.

More specifically, according to the disclosure of the above patent document, each of the protruding parts of the electric conductor segments is configured to include, at its distal end, an axially-extending section that extends straight in the axial direction of the stator core. In joining each corresponding pair of the protruding parts of the electric conductor segments, the axially-extending sections of the protruding parts are radially brought into contact with each other and then welded together.

However, with the axially-extending sections of the protruding parts of the electric conductor segments, it may be difficult to minimize the axial height of the coil ends of the stator coil. Consequently, it may be difficult to minimize the size of the entire stator coil.

Furthermore, a stator coil used in a rotating electric machine generally generates heat during operation. Therefore, it is necessary to cool the stator coil so as to secure high performance of the rotating electric machine.

For example, in the case of an automotive alternator, the stator coil of the alternator is generally cooled by cooling air which is supplied to the coil ends of the stator coil by cooling fans provided in the alternator. Accordingly, in this case, for effectively cooling the stator coil, it is desirable for the coil ends of the stator coil to have a structure that facilitates the passing of the cooling air through the coil ends.

SUMMARY

According to exemplary embodiments, there is provided a stator for a rotating electric machine. The stator includes an annular stator core and a stator coil mounted on the stator core. The stator core has a plurality of slots formed therein; the slots are spaced from one another in a circumferential direction of the stator core. The stator coil is formed of a plurality of electric conductor segments each of which has a substantially rectangular cross section with its width greater than its thickness. Each of the electric conductor segments is bent in its thickness direction to include, at least, an in-slot portion and an oblique portion. The in-slot portion is received in a corresponding one of the slots of the stator core with the width direction of the in-slot portion coinciding with a radial direction of the stator core. The oblique portion protrudes from the in-slot portion outside the corresponding slot and extends, over its entire length, along the circumferential direction of the stator core obliquely with respect to an axial end face of the stator core. The oblique portion includes a thick section and a thin section. The thick section has one end connected to the in-slot portion and the other end connected to the thin section; the thick section has substantially the same thickness as the in-slot portion. The thin section has one end connected to the thick section and the other end defining a distal end of the oblique portion; the thin section has a thickness less than the thickness of the thick section. Each corresponding pair of the oblique portions of the electric conductor segments are connected by joining the thin sections of the oblique portions.

With the above configuration, each of the oblique portions of the electric conductor segments has no axially-extending section. Consequently, it becomes possible to reduce the axial height of coil ends of the stator coil. Further, with the reduction in the axial height of the coil ends, it also becomes possible to lower the resistance of the coil ends to the flow of cooling air that is supplied to radially pass through the coil ends.

Moreover, with the above configuration, since the thickness of the thin section is set to be less than the thickness of the thick section for each of the oblique portions of the electric conductor segments, it becomes possible to reduce the radial projection area of the joining region between each corresponding pair of the oblique portions of the electric conductor segments. Consequently, with the reduction in the radial projection area of the joining region, it becomes possible to further lower the resistance of the coil ends to the flow of the cooling air radially passing through it.

As a result, with the above configuration, it becomes possible to minimize the size of the rotating electric machine, improve the performance of the rotating electric machine and reduce wind noise generated in the rotating electric machine.

Preferably, each of the oblique portions of the electric conductor segments may further include a taper section that is formed between the thick and thin sections so as to taper from the thick section to the thin section.

According to a first embodiment, for each of the oblique portions of the electric conductor segments, both the thick and thin sections of the oblique portion extend along a common axis oblique to the axial end face of the stator core. For each corresponding pair of the oblique portions of the electric conductor segments, the thin sections of the oblique portions have their respective side faces in contact with and joined to each other; the side faces respectively define the thicknesses of the thin sections and face each other in a radial direction of the stator core.

According to one modification of the first embodiment, for each of the thin sections of the oblique portions of the electric conductor segments, the side face of the thin section is formed so as to be oblique to an extending direction of the oblique portion. For each corresponding pair of the oblique portions of the electric conductor segments, the thin sections of the oblique portions are radially inclined toward each other to have their respective side faces in contact with each other.

According to a second embodiment, for each of the oblique portions of the electric conductor segments, the thin section of the oblique portion includes a first part connected to the thick section of the oblique portion and a second part that includes the distal end of the oblique portion. Each corresponding pair of the oblique portions of the electric conductor segments are connected by joining the second parts of the thin sections of the oblique portions.

Further, according to the second embodiment, for each of the thin sections of the oblique portions of the electric conductor segments, the first and second parts of the thin section extend obliquely at different oblique angles with respect to the axial end face of the stator core so that there is an angle formed between the first and second parts.

According to the second embodiment, for each corresponding pair of the oblique portions of the electric conductor segments, the second parts of the thin sections of the oblique portions are radially inclined across each other to have their respective distal end portions overlapping each other in the circumferential direction of the stator core. The second parts of the thin sections are joined at the overlapping area between the distal end portions thereof.

According to the second embodiment, for each of the oblique portions of the electric conductor segments, the thin section of the oblique portion further has a constriction that is formed at the boundary between the first and second parts of the thin section and recessed inward in one of the width and thickness directions of the thin section.

It is preferable that for each of the oblique portions of the electric conductor segments, the thick section of the oblique portion is covered with an insulating material whereas the thin section of the oblique portion has no insulating material covering it.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings:

FIG. 5 is a perspective view illustrating the arrangement of a corresponding pair of the oblique portions of the electric conductor segments to be joined together;

DESCRIPTION OF EMBODIMENTS

Figure 1:
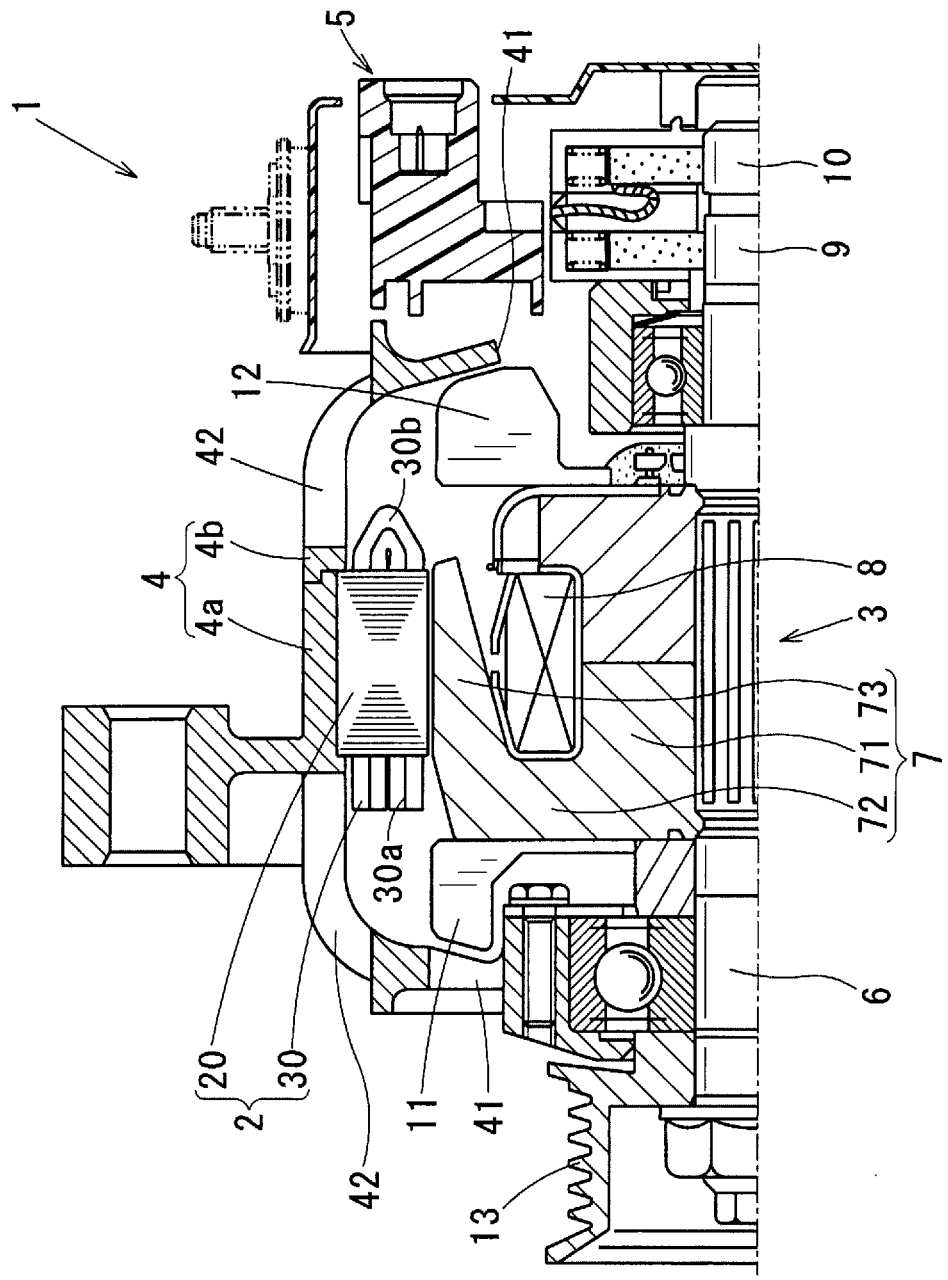
FIG. 1 is a partially cross-sectional view of an upper half of an automotive alternator which includes a stator according to a first embodiment.

Exemplary embodiments will be described hereinafter with reference to FIGS. 1-8B. It should be noted that for the sake of clarity and ease of understanding, identical components having identical functions throughout the whole description have been marked, where possible, with the same reference numerals in each of the figures and that for the sake of avoiding redundancy, descriptions of the identical components will not be repeated.

[First Embodiment]

FIG. 1 shows the overall configuration of a rotating electric machine 1 which includes a stator 2 according to a first embodiment.

In the present embodiment, the rotating electric machine 1 is configured as an automotive alternator for use in a motor vehicle, such as a passenger car or a truck.

As shown in FIG. 1, the alternator 1 includes: the stator 2 that functions as an armature; a rotor 3 that functions as a field; a housing 4 composed of a pair of front and rear housing pieces 4a and 4b that together retain the stator 2 therebetween and to rotatably support the rotor 3 via bearings; and a rectifier 5 that rectifies three-phase AC power outputted from the stator 2 into DC power.

The stator 2 includes an annular stator core 20 and a three-phase stator coil 30 mounted on the stator core 20. The configuration of the stator 20 will be described in detail later.

The rotor 3 includes a rotating shaft 6, a pair of Lundell-type magnetic pole cores 7, a field coil 8, slip rings 9 and 10, a mixed-flow fan 11 and a centrifugal fan 12.

The rotating shaft 6 has a pulley 13 mounted on a front end portion thereof (i.e., a left end portion in FIG. 1), so that it can be driven by an internal combustion engine of the vehicle via the pulley 13.

Each of the magnetic pole cores 7 has a hollow cylindrical boss portion 71, a disc portion 72, and a plurality of magnetic pole claws 73. The boss portion 71 is fitted on the rotating shaft 6 so as to rotate along with the rotating shaft 6. The disc portion 72 extends radially outward from an axially outer part of the boss portion 71. Each of the magnetic pole claws 73 axially extends from a radially outer part of the disc portion 72.

The magnetic pole cores 7 are assembled together so that the magnetic pole claws 73 of one of the magnetic pole cores 7 are interleaved with the magnetic pole claws 73 of the other magnetic pole core 7.

The field coil 8 is formed by winding an insulation-treated copper wire into a hollow cylindrical shape. The field coil 8 is mounted on both the boss portions 71 of the magnetic pole cores 7 so as to be axially interposed between the disc portions 72 of the magnetic pole cores 7. In addition, the field coil 8 also abuts a radially inner part of each of the magnetic pole claws 73 of the magnetic pole cores 7.

The slip rings 9 and 10 are provided on a rear end portion (i.e., a right end portion in FIG. 1) of the rotating shaft 6 and respectively electrically connected to opposite ends of the field coil 8.

The mixed-flow cooling fan 11 includes a base plate and a plurality of blades. The base plate is fixed, for example by welding, to a front end face of the disc portion 72 of the front-side magnetic pole core 7. Some of the blades are fixed to the base plate so as to be oblique at an acute angle to the base plate; the other blades are fixed to the base plate so as to be perpendicular to the base plate.

The centrifugal cooling fan 12 also includes a base plate and a plurality of blades. The base plate is fixed, for example by welding, to a rear end face of the disc portion 72 of the rear-side magnetic pole core 7. All the blades are fixed to the base plate so as to be perpendicular to the base plate.

Both the mixed-flow and centrifugal cooling fans 11 and 12 together make up means for supplying cooling air to the stator coil 30 of the stator 2.

The front housing piece 4a has a plurality of cooling air inlets 41 formed through a front end wall thereof. The front housing piece 4a also has a plurality of cooling air outlets 42 that are formed through a circumferential wall of the front housing piece 4a so as to be radially opposite to a first coil end group 30a of the stator coil 30 of the stator 2. On the other hand, the rear housing piece 4b has a plurality of cooling air inlets 41 formed through a rear end wall thereof. The rear housing piece 4b also has a plurality of cooling air outlets 42 that are formed through a circumferential wall of the rear housing piece 4b so as to be radially opposite to a second coil end group 30b of the stator coil 30 of the stator 2.

The rectifier 5 is arranged outside of the rear housing piece 4b so as to be exposed to the cooling air sucked into the rear housing piece 4b via the cooling air inlets 41.

After having described the overall configuration of the alternator 1, the detailed configuration of the stator 2 according to the present embodiment will be described with reference to FIGS. 2-6B.

In the present, the stator core 20 is formed by laminating a plurality of core sheets (or steel sheets) into an annular (or hollow cylindrical) shape. In the radially inner surface of the stator core 20, there are formed a plurality of slots 21 so as to penetrate the stator core 20 in the axial direction thereof. Moreover, the slots 21 are spaced from one another in the circumferential direction of the stator core 20 at a constant pitch and each extend in a radial direction of the stator core 20. That is, for each of the slots 21, the depth direction of the slot 21 coincides with the radial direction of the stator core 20.

The stator coil 30 is mounted on the stator core 20 so as to be partially received in the slots 21 of the stator core 20 with insulating sheets 22 interposed between the stator coil 30 and those internal walls of the stator core 20 which define the slots 21. Moreover, those parts of the stator coil 30 which protrude outside the slots 21 on one axial side (i.e., the right side in FIG. 1) of the stator core 20 make up the second coil end group 30b; those parts of the stator coil 30 which protrude outside the slots 21 on the other axial side (i.e., the left side in FIG. 1) of the stator core 20 make up the first coil end group 30a.

Figure 2:
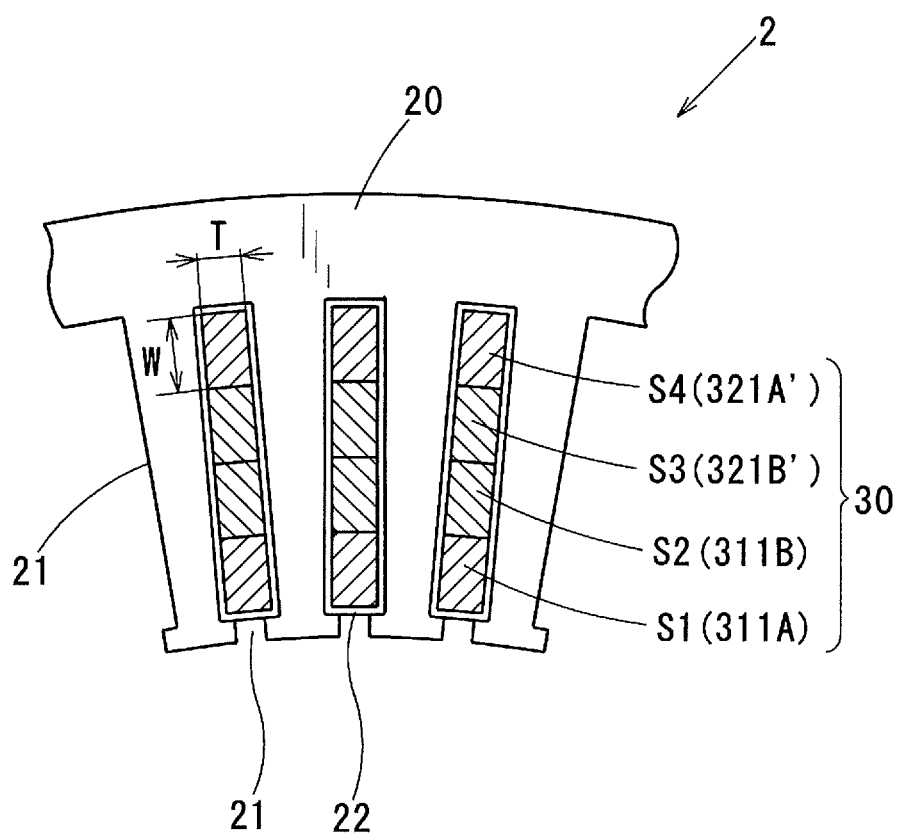
FIG. 2 is a partially cross-sectional view illustrating the arrangement of electric conductor segments in slots of a stator core of the stator, the electric conductor segments together forming a stator coil of the stator.

The stator coil 30 can be considered as being formed by connecting electric conductors received in the slots 21 of the stator core 20. That is, as shown in FIG. 2, in each of the slots 21 of the stator core 20, there are received an even number (e.g., four in the present embodiment) of electric conductors in alignment with each other in the radial direction of the stator core 20 (or in the depth direction of the slot 21). Hereinafter, for the sake of convenience of explanation, the four electric conductors are sequentially referred to as an innermost electric conductor S1, an inner-middle electric conductor S2, an outer-middle electric conductor S3, and an outermost electric conductor S4 from the radially inside to the radially outside of the slot 21.

Figure 3:
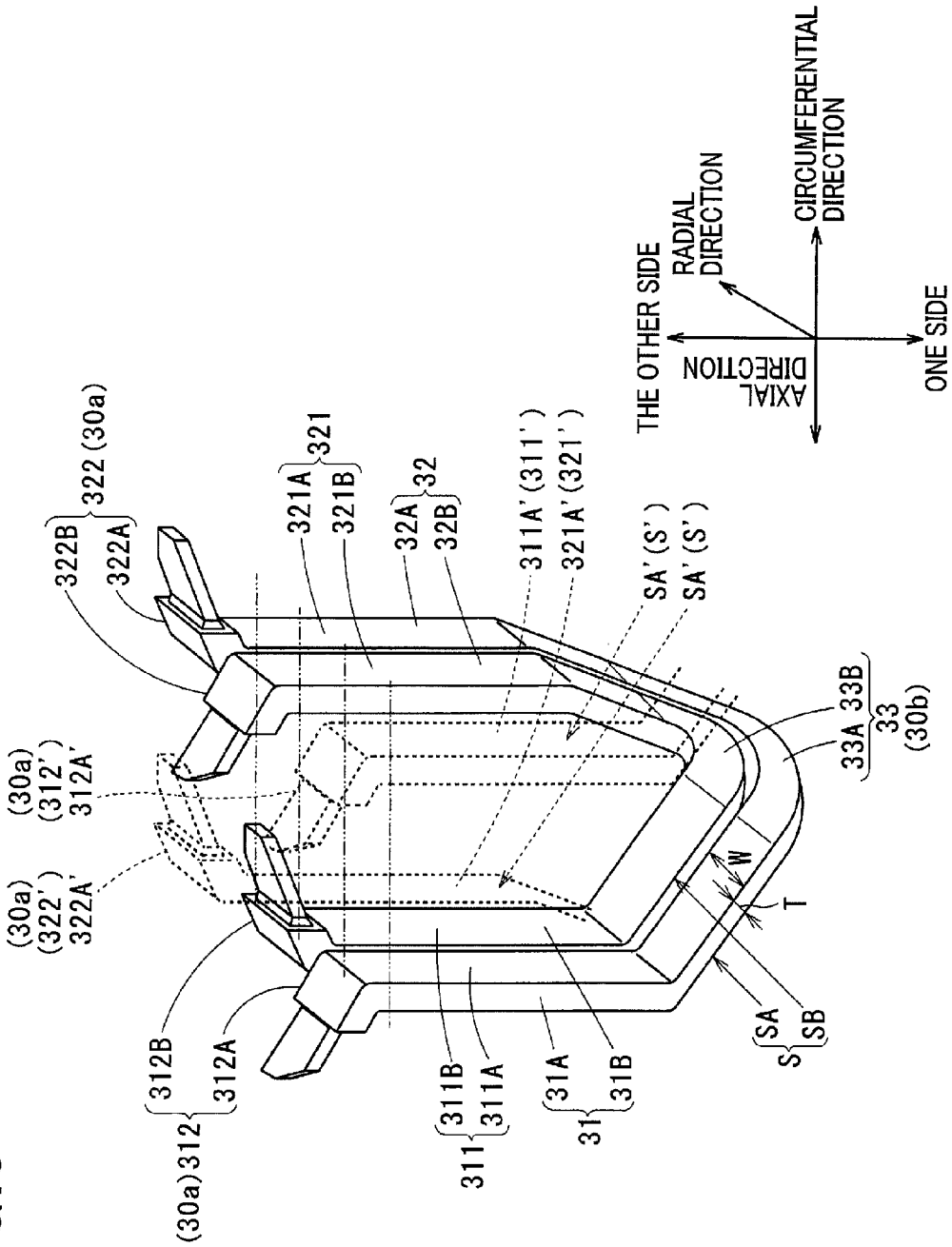
FIG. 3 is a perspective view illustrating the configuration of the electric conductor segments forming the stator coil.

In the present embodiment, the electric conductors S1-S4 received in the slots 21 of the stator core 20 are provided by mounting a plurality of substantially U-shaped electric conductor segments S as shown in FIG. 3 to the stator core 20. That is, the stator coil 30 is formed by mounting the substantially U-shaped electric conductor segments S to the stator core 20 and then joining corresponding pairs of the electric conductor segments S.

Moreover, in the present embodiment, as shown in FIG. 3, the electric conductor segments S are comprised of a plurality of pairs of large and small electric conductor segments SA and SB. Each of the large and small electric conductor segments SA and SB is bent on one side into the substantially U-shape and has a pair of free ends on the other side.

In addition, for the sake of convenience of explanation and ease of understanding, in the drawings, some of the electric conductor segments SA and SB, which are matched (or connected) with other electric conductor segments, are shown with dashed lines and have the superscript ['] (i.e., apostrophe) attached thereto; the other electric conductor segments SA and SB are shown with continuous lines and have no superscript attached thereto; portions (or parts) of the electric conductor segments SA' and SB' are designated by respective reference numerals with [']; portions (or parts) of the electric conductor segments SA and SB are designated by respective reference numerals without ['].

In the present embodiment, each of the U-shaped electric conductor segments S (SA, SB) is formed and mounted to the stator core 20 in the following way. First, a straight electric conductor segment is obtained by cutting an electric conductor wire into a predetermined length; the electric conductor wire has a substantially rectangular cross section with its width W greater than its thickness T. The obtained straight electric conductor segment is then bent into a substantially U-shape, thereby forming a pair of straight portions 31 and 32 (i.e., 31A and 32A or 31B and 32B in FIG. 3) and a turn portion 33 (i.e., 33A or 33B in FIG. 3) that connects ends of the straight portions 31 on the same side. Further, the straight portions 31 and 32 are spread, by being each twisted at a predetermined position in a predetermined direction, to define a predetermined interval (or span) therebetween. Thereafter, the straight portions 31 and 32 are axially inserted, from the one axial side of the stator core 20, respectively into corresponding two slots 21 of the stator core 20 so that parts of the straight portions 31 and 32 respectively protrude outside the corresponding two slots 21 on the other axial side of the stator core 20. Then, the protruding parts of the straight portions 31 and 32 are bent in their respective thickness directions so as to extend along the circumferential direction of the stator core 20 obliquely at a predetermined oblique angle with respect to the axial end face 20*a* of the stator core 20. Consequently, the protruding parts of the straight portions 31 and 32 make up a pair of oblique portions 312 and 322 (i.e., 312A and 322A or 312B and 322B in FIG. 3) of the electric conductor segment S (i.e., SA or SB in FIG. 3); those parts of the straight portions 31 and 32 which are respectively received in the corresponding two slots 21 of the stator core 20 make up a pair of in-slot portions 311 and 321 (i.e., 311A and 321A or 311B and 321B in FIG. 3) of the electric conductor segment S.

After forming all the oblique portions 312 and 322 of the electric conductor segments S as above, corresponding pairs of the oblique portions 312 and 322 of the electric conductor segments S are joined by welding. Consequently, the stator coil 30 is obtained in which: all the oblique portions 312 and 322 of the electric conductor segments S, which respectively protrude outside the corresponding slots 21 on the other axial side of the stator core 20, together make up the first coil end group 30*a* of the stator coil 30; and all the turn portions 33 of the electric conductor segments S, which respectively protrude outside the corresponding slots 21 on the one axial side of the stator core 20, together make up the second coil end group 30*b* of the stator coil 20 (see FIG. 1).

Moreover, in the present embodiment, as shown in FIG. 2, each of the in-slot portions 311 and 321 (311A and 321A, 311B and 321B) of the electric conductor segments S (SA, SB) is received in the corresponding slot 21 of the stator core 20 with its width direction coinciding with the radial direction of the stator core 20 (or the depth direction of the corresponding slot 21).

Figure 4:
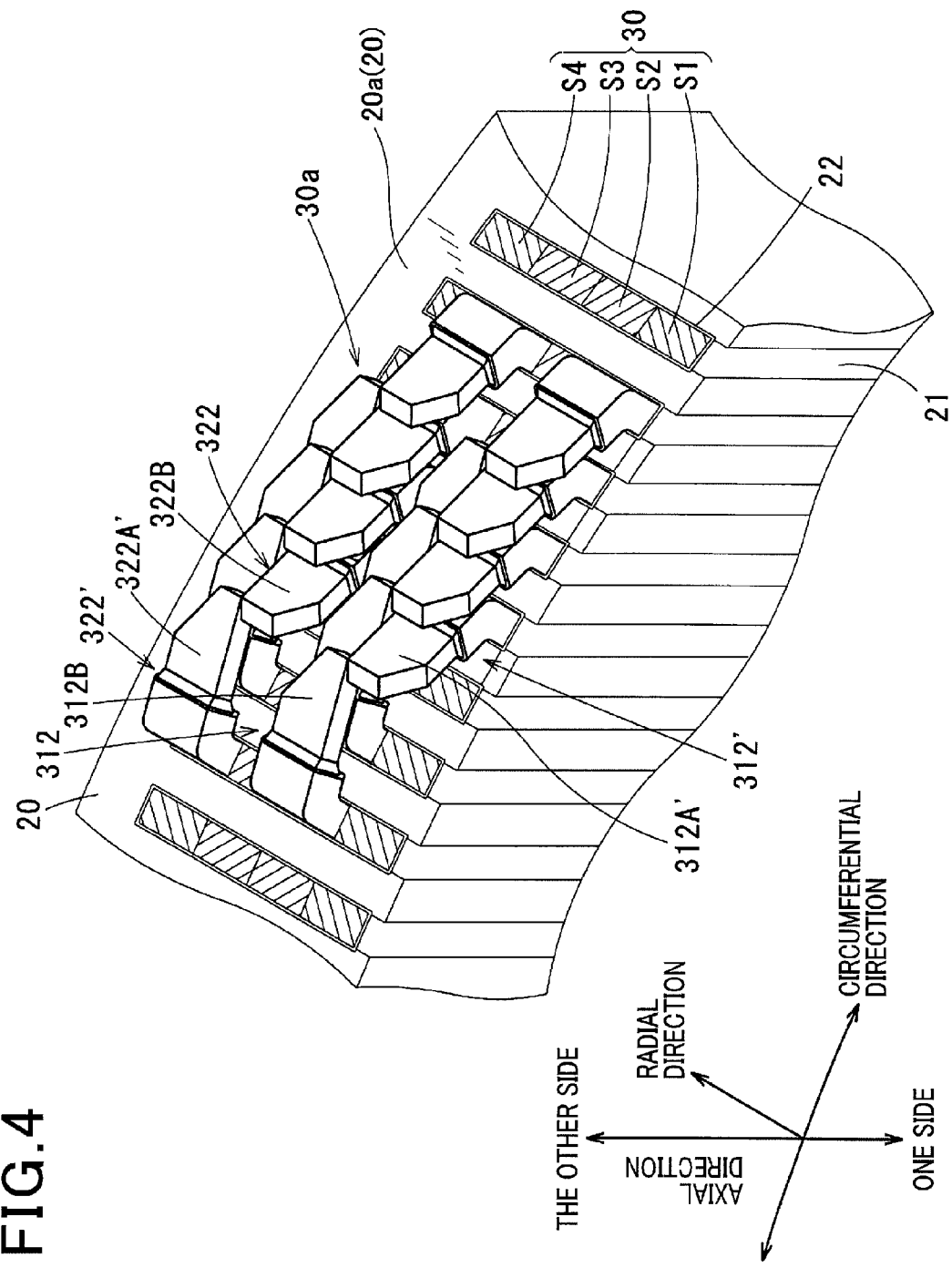
FIG. 4 is a schematic view illustrating the configuration of oblique portions of the electric conductor segments, the oblique portions protruding outside the slots of the stator core from an axial end face of the stator core and extending in a circumferential direction of the stator core obliquely with respect to the axial end face of the stator core.

Next, the connection between the in-slot portions 311 and 321 of the electric conductor segments S will be described with reference to FIGS. 2-4.

In the present embodiment, each connected pair of the in-slot portions 311 and 312 of the electric conductor segments S are respectively received in a pair of the slots 21 of the stator core 20 which are circumferentially separated from each other by a predetermined pitch and radially positioned in different layers in the respective slots 21.

For example, on the one axial side of the stator core 20, for one of the slots 21, the innermost in-slot portion 311A (or electric conductor S1) in the slot 21 is connected, via one turn portion 33A, to the outermost in-slot portion 321A (or electric conductor S4) in another one of the slots 21 which is positioned away from the slot 21 by one magnetic pole pitch in the clockwise direction. That is, all of the innermost in-slot portion 311A, the turn portion 33A and the outermost in-slot portion 321A, which are connected with one another, are integrally formed into one of the large electric conductor segments SA. In addition, it should be noted that "the clockwise direction" hereinafter denotes the clockwise direction with the point of sight located on the one axial side of the stator core 20 (i.e., the lower side in FIG. 3).

Similarly, on the one axial side of the stator core 20, for one of the slots 21, the inner-middle in-slot portion 311B (or electric conductor S2) in the slot 21 is connected, via one turn portion 33B, to the outer-middle in-slot portion 321B (or electric conductor S3) in another one of the slots 21 which is positioned away from the slot 21 by one magnetic pole pitch in the clockwise direction. That is, all of the inner-middle in-slot portion 311B, the turn portion 33B and the outer-middle in-slot portion 321B, which are connected with one another, are integrally formed into one of the small electric conductor segments SB.

Consequently, on the one axial side of the stator core 20, each of the turn portions 33B of the small electric conductor segments SB is partially surrounded by a corresponding one of the turn portions 33A of the large electric conductor segments SA. As a result, each of the turn portions 33B of the small electric conductor segments SB makes up one axially-inner coil end of the stator coil 30; each of the turn portions 33A of the large electric conductor segments SA makes up one axially-outer coil end of the stator coil 30; and all of the axially-inner and axially-outer coil ends together make up the second coil end group 30*b*.

Moreover, on the other axial side of the stator core 20, for one of the slots 21, the inner-middle in-slot portion 311B (or electric conductor S2) in the slot 21 is connected to the innermost in-slot portion 311A' (or electric conductor S1) in another one of the slots 21 which is positioned away from the slot 21 by one magnetic pole pitch in the clockwise direction. More specifically, the inner-middle in-slot portion 311B is connected to the innermost in-slot portion 311A' by joining a pair of the oblique portions 312B and 312A' which respectively extend from the inner-middle in-slot portion 311B and the innermost in-slot portion 311A'.

Similarly, on the other axial side of the stator core 20, for one of the slots 21, the outermost in-slot portion 321A' (or electric conductor S4) is connected to the outer-middle in-slot portion 321B (or electric conductor S3) in another one of the slots 21 which is positioned away from the slot 21 by one magnetic pole pitch in the clockwise direction. More specifically, the outermost in-slot portion 321A' is connected to the outer-middle in-slot portion 321B by joining a pair of the oblique portions 322A' and 322B which respectively extend from the outermost in-slot portion 321A' and the outer-middle in-slot portion 321B.

Consequently, on the other axial side of the stator core 20, each of the joints formed between the oblique portions 312B and 312A' is radially positioned inside and in alignment with a corresponding one of the joints formed between the oblique portions 322A' and 322B. As a result, each joined pair of the oblique portions 312B and 312A' makes up one radially-inner coil end of the stator coil 30; each joined pair of the oblique portions 322A' and 322B makes up one radially-outer coil end of the stator coil 30; and all of the radially-inner and radially-outer coil ends together make up the first coil end group 30*a*.

Referring now to FIG. 5, the detailed configuration of the oblique portions 312 and 322 of the electric conductor segments S according to the present embodiment will be described by taking the joined pair of one oblique portion 312B and one oblique portion 312A' as an example.

In addition, for the sake of convenience of explanation, the oblique portions 312B and 312A' shown in FIG. 5 will be respectively simply referred to as oblique portions 100 and 200 hereinafter.

As shown in FIG. 5, in the present embodiment, each of the oblique portions 100 and 200 is bent in its thickness direction so as to extend, over its entire length, along the circumferential direction of the stator core 20 obliquely with respect to the axial end face 20*a* of the stator core 20.

Moreover, the oblique portion 100 is configured to include a thick section 110 on the proximal side and a thin section 120 on the distal side. The thick section 110 has one end connected to the in-slot portion 311B of the electric conductor segment SB (see FIG. 3) and the other end connected to the thin section 120. Further, the thick section 110 has substantially the same thickness T and width W as the in-slot portion 311B. On the other hand, the thin section 120 has one end connected to the thick section 110 and the other end defining the distal end of the oblique portion 100. Further, the thin section 120 has a thickness t less than the thickness T of the thick section 110 and a width w less than the width W of the thick section 110. In addition, the entire thick section 110 is covered with an insulating material 111, whereas the thin section 120 has no insulating material covering it (or is bared).

Furthermore, both the thick and thin sections 110 and 120 extend along a common axis oblique to the axial end face 20a of the stator core 20. In other words, both the thick and thin sections 110 and 120 extend obliquely at the same oblique angle with respect to the axial end face 20a of the stator core 20. Further, the thick and thin sections 110 and 120 are connected via a taper section 112 that has four faces tapering from the thick section 110 to the thin section 120. That is, both the thickness and width of the taper section 112 are gradually decreased from the thick section 110 to the thin section 120. In addition, the taper section 112 also has no insulating material covering it (or is bared).

Similarly, the oblique portion 200 is configured to include a thick section 210 on the proximal side and a thin section 220 on the distal side. The thick section 210 has one end connected to the in-slot portion 311A' of the electric conductor segment SA' (see FIG. 3) and the other end connected to the thin section 220. Further, the thick section 210 has substantially the same thickness T and width W as the in-slot portion 311A'. On the other hand, the thin section 220 has one end connected to the thick section 210 and the other end defining the distal end of the oblique portion 200. Further, the thin section 220 has a thickness t less than the thickness T of the thick section 210 and a width w less than the width W of the thick section 210. In addition, the entire thick section 210 is covered with an insulating material 211, whereas the thin section 220 has no insulating material covering it (or is bared).

Furthermore, the thick and thin sections 210 and 220 extend along the same axis oblique to the axial end face 20a of the stator core 20. In other words, the thick and thin sections 210 and 220 have the same oblique angle with respect to the axial end face 20a of the stator core 20. Further, the thick and thin sections 210 and 220 are connected via a taper section 212 that has four faces tapering from the thick section 210 to the thin section 220. That is, both the thickness and width of the taper section 212 are gradually decreased from the thick section 210 to the thin section 220. In addition, the taper section 212 also has no insulating material covering it (or is bared).

Figure 6A:
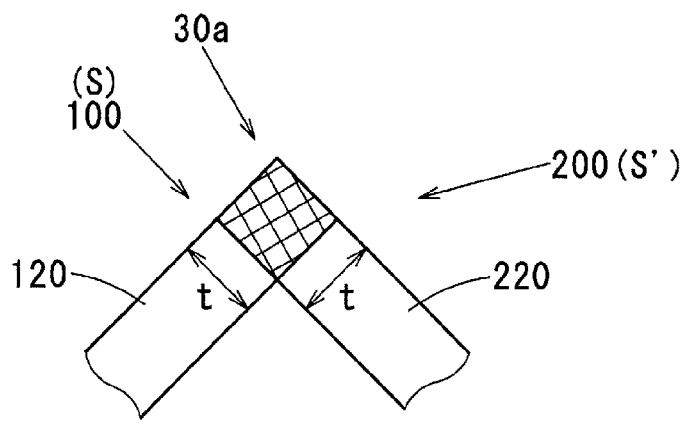
FIG. 6A is a view of a joining region between the corresponding pair of the oblique portions of the electric conductor segments along a radial direction of the stator core.
Figure 6B:
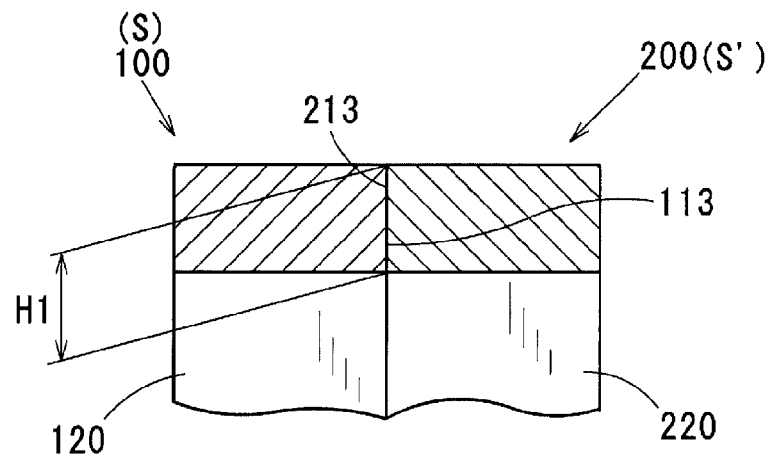
FIG. 6B is a view of the joining region along the circumferential direction of the stator core.

Referring to FIGS. 6A-6B together with FIG. 5, in joining the pair of the oblique portions 100 and 200, a side face 113 of the thin section 120 of the oblique portion 100 and a side face 213 of the thin section 220 of the oblique portion 200 are first brought into contact with each other at their respective distal end portions. The side faces 113 and 213 respectively define the thicknesses t of the thin sections 120 and 220 of the oblique portions 100 and 200 and face each other in the radial direction of the stator core 20. Then, the side faces 113 and 213 are welded at their distal end portions which are in contact with each other. Consequently, the electric conductor segments SB and SA' are electrically connected to each other.

In FIG. 6A, the meshed area represents the joining region between the side face 113 of the thin section 120 of the oblique portion 100 and the side face 213 of the thin section 220 of the oblique portion 200. In the present embodiment, since the side faces 113 and 213 respectively define the thicknesses t of the thin sections 120 and 220 of the oblique portions 100 and 200 and face each other in the radial direction of the stator core 20, it is possible minimize the radial projection area (i.e., the area projected in the radial direction of the stator core 20) of the joining region therebetween. More specifically, the radial projection area of the joining region can be made so small as to be equal to $t^2$ at most.

In addition, referring again to FIG. 5, the thin section 120 of the oblique portion 100 has a chamfer 124 formed at its distal corner on the radially opposite side to the side face 113. Similarly, the thin section 220 of the oblique portion 200 has a chamfer 224 formed at its distal corner on the radially opposite side to the side face 213. Those chamfers 124 and 224 are provided for avoiding various undesirable effects which would be caused by configuring the distal corners as right-angled corners.

Next, advantages of the stator 2 according to the present embodiment will be described.

In operation of the automotive alternator 1, upon transmission of torque from the engine of the vehicle to the pulley 13 via a belt (not shown), the rotor 3 is driven by the torque to rotate in a predetermined direction. During the rotation of the rotor 3, field current is supplied to the field coil 8 through sliding contact between the slip rings 9 and 10 and brushes arranged on the outer periphery of the slip rings 9 and 10, thereby magnetizing the magnetic pole claws 73 of the magnetic pole cores 7 to create a rotating magnetic field. The rotating magnetic field induces the three-phase AC power in the stator coil 30. Then, the rectifier 5 rectifies the three-phase AC power outputted from the stator coil 30 into the DC power and outputs the obtained DC power via output terminals thereof.

Moreover, the efficiency of the alternator 1 may be lowered by heat generated by the stator coil 30 during the operation. Therefore, in the alternator 1, there are provided both the mixed-flow and centrifugal cooling fans 11 and 12 to supply cooling air to the stator coil 30. More specifically, during the operation, both the mixed-flow and centrifugal cooling fans 11 and 12 rotate with the rotor 3, causing the cooling air to be sucked into the housing 4 via the cooling air inlets 41, radially pass through the first and second coil end groups 30a and 30b of the stator coil 30 and be discharged out of the housing 4 via the cooling air outlets 42.

Furthermore, the efficiency of cooling the stator coil 30 by the cooling air depends on the resistance of the first and second coil end groups 30a and 30b to the flow of the cooling air radially passing through them. In other words, to effectively cool the stator coil 30 using the cooling air, it is necessary to lower the resistance of the first and second coil end groups 30a and 30b to the flow of the cooling air radially passing through them.

In view of the above, in the present embodiment, each of the oblique portions 100 and 200 (or 312, 322, 312'', 322') of the electric conductor segments S (S') is configured to protrude from the in-slot portion (311, 321, 311', 321') outside the corresponding slot 21 and extend, over its entire length, along the circumferential direction of the stator core 20 obliquely with respect to the axial end face 20a of the stator core 20. Moreover, each of the oblique portions 100 and 200 is further configured to include the thick section 110 or 210 and the thin section 120 or 220. The thick section 110 or 210 has one end connected to the in-slot portion and the other end connected to the thin section 120 or 220; the thick section has substantially the same thickness T as the in-slot portion. The thin section 120 or 220 has one end connected to the thick section 110 or 210 and the other end defining the distal end of the oblique portion; the thin section has the thickness t less than the thickness T of the thick section. Each corresponding pair of the oblique portions 100 and 200 of the electric conductor segments S and S' are connected by joining the thin sections 120 and 220 of the oblique portions 100 and 200.

With the above configuration, each of the oblique portions 100 and 200 has no axially-extending section as in the stator disclosed in Japanese Unexamined Patent Application Publication No. 2000-350422. Consequently, it becomes possible to reduce the axial height of the first coil end group 30*a*. Further, with the reduction in the axial height of the first coil end group 30*a*, it also becomes possible to lower the resistance of the first coil end group 30*a* to the flow of the cooling air radially passing through it.

Moreover, with the above configuration, since the thickness t of the thin section is set to be less than the thickness T of the thick section for each of the oblique portions 100 and 200, it becomes possible to reduce the radial projection area of the joining region between each corresponding pair of the oblique portions 100 and 200 of the electric conductor segments S and S'. Consequently, with the reduction in the radial projection area of joining region, it becomes possible to further lower the resistance of the first coil end group 30*a* to the flow of the cooling air radially passing through it.

As a result, with the above configuration, it becomes possible to minimize the size of the alternator 1, improve the performance of the alternator 1 and reduce wind noise generated in the alternator 1.

Furthermore, with the above configuration, since the thickness t of the thin section is set to be less than the thickness T of the thick section for each of the oblique portions 100 and 200, it becomes possible to reduce the weld heat input required for joining each corresponding pair of the oblique portions 100 and 200 of the electric conductor segments S and S' by welding. Moreover, it also becomes possible to reduce the size of the weld beads formed between corresponding pairs of the oblique portions 100 and 200 of the electric conductor segments S and S', thereby securing a sufficient electrical insulation distance (or clearance) between radially-adjacent pairs of the oblique portions 100 and 200.

In the present embodiment, each of the oblique portions 100 and 200 of the electric conductor segments is configured to further include the taper section 112 or 212 that is formed between the thick and thin sections so as to taper from the thick section to the thin section.

With the above configuration, it becomes possible to relax stress concentration at the boundary between the thick and thin sections. Consequently, it becomes possible to secure high strength and high reliability of the stator coil 30.

In the present embodiment, each of the oblique portions 100 and 200 of the electric conductor segments is configured so that both the thick and thin sections of the oblique portion extend along the common axis oblique to the axial end face 20*a* of the stator core 20. Further, for each corresponding pair of the oblique portions 100 and 200 of the electric conductor segments S and S', the thin sections 120 and 220 of the oblique portions 100 and 200 have their respective side faces 113 and 213 in contact with and joined to each other; the side faces 113 and 213 respectively define the thicknesses t of the thin sections 120 and 220 and face each other in the radial direction of the stator core 20.

With the above configuration, it becomes possible to minimize the axial height of the first coil end group 30*a*. Moreover, it becomes possible to facilitate the process of welding each corresponding pair of the oblique portions 100 and 200 of the electric conductor segments S and S'.

In the present embodiment, each of the oblique portions 100 and 200 of the electric conductor segments is configured so that the thick section of the oblique portion is covered with the insulating material 111 or 211, and the thin section of the oblique portion has no insulating material covering it.

With the above configuration, the insulating materials 111 and 211 covering the thick sections 110 and 210 of the oblique portions 100 and 200 may be damaged by the weld heat input to the thin sections 120 and 220 during the process of welding each corresponding pair of the oblique portions 100 and 200 of the electric conductor segments. However, as described previously, in the present embodiment, since the thickness t of the thin section is set to be less than the thickness T of the thick section for each of the oblique portions 100 and 200, it becomes possible to reduce the weld heat input required for welding each corresponding pair of the oblique portions 100 and 200 of the electric conductor segments S and S'. Consequently, it becomes possible to prevent the insulating materials 111 and 211 covering the thick sections 110 and 210 of the oblique portions 100 and 200 from being damaged by the weld heat input to the thin sections 120 and 220 during the welding process.

[Modification of First Embodiment]

Referring again to FIG. 6B, in the previous embodiment, for each of the thin sections 120 and 220 of the oblique portions 100 and 200 of the electric conductor segments S and S', the side face 113 or 213 of the thin section is formed parallel to the extending direction of the oblique portion. Moreover, in joining each corresponding pair of the oblique portions 100 and 200 of the electric conductor segments S and S', the thin sections 120 and 220 of the oblique portions 100 and 200 are placed parallel with each other to have their respective side faces 113 and 213 in contact with each other. Consequently, in this case, the maximum contact length H1 between the thin sections 120 and 220 is equal to the thickness t of the thin sections 120 and 220.

Figure 6C:
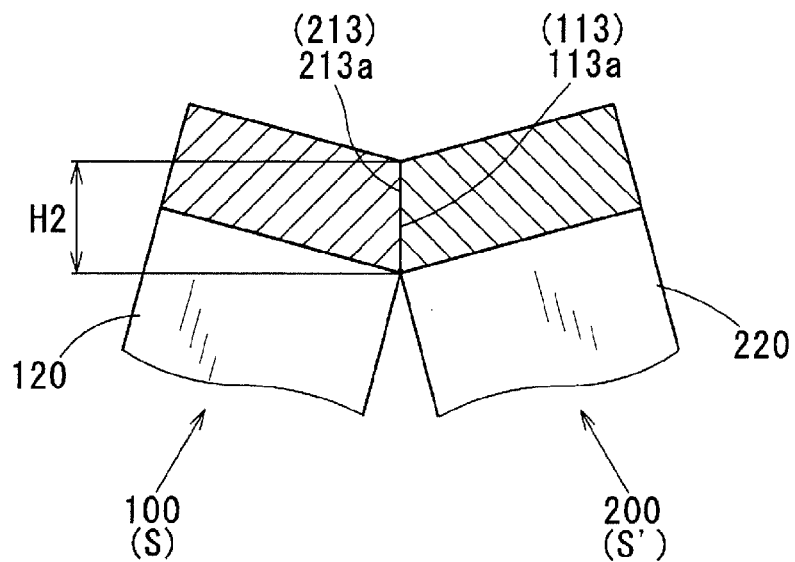
FIG. 6C is a view illustrating the configuration of the oblique portions of the electric conductor segments according to a modification of the first embodiment.

FIG. 6C illustrates the configuration of the oblique portions 100 and 200 of the electric conductor segments S and S' according to a modification.

As shown in FIG. 6C, in this modification, for each of the thin sections 120 and 220 of the oblique portions 100 and 200 of the electric conductor segments S and S', the side face 113 or 213 of the thin section is formed as an oblique face 113*a* or 213*a* that is oblique to the extending direction of the oblique portion. Moreover, in joining each corresponding pair of the oblique portions 100 and 200 of the electric conductor segments S and S', the thin sections 120 and 220 of the oblique portions 100 and 200 are radially inclined toward each other to have their respective oblique faces 113*a* and 213*a* in contact with each other. Consequently, in this case, the maximum contact length H2 between the thin sections 120 and 220 is greater than the thickness t of the thin sections 120 and 220.

That is, by this modification, the maximum contact length between the thin sections 120 and 220 is increased from H1 to H2. Consequently, the joining region between the thin sections 120 and 220 is increased without increasing the radial projection area of the joining region. As a result, it becomes possible to enhance the joining strength (or welding strength) between each corresponding pair of the oblique portions 100 and 200 of the electric conductor segments S and S' without increasing the resistance of the first coil end group 30*a* to the flow of the cooling air radially passing through it.

[Second Embodiment]

Figure 7:
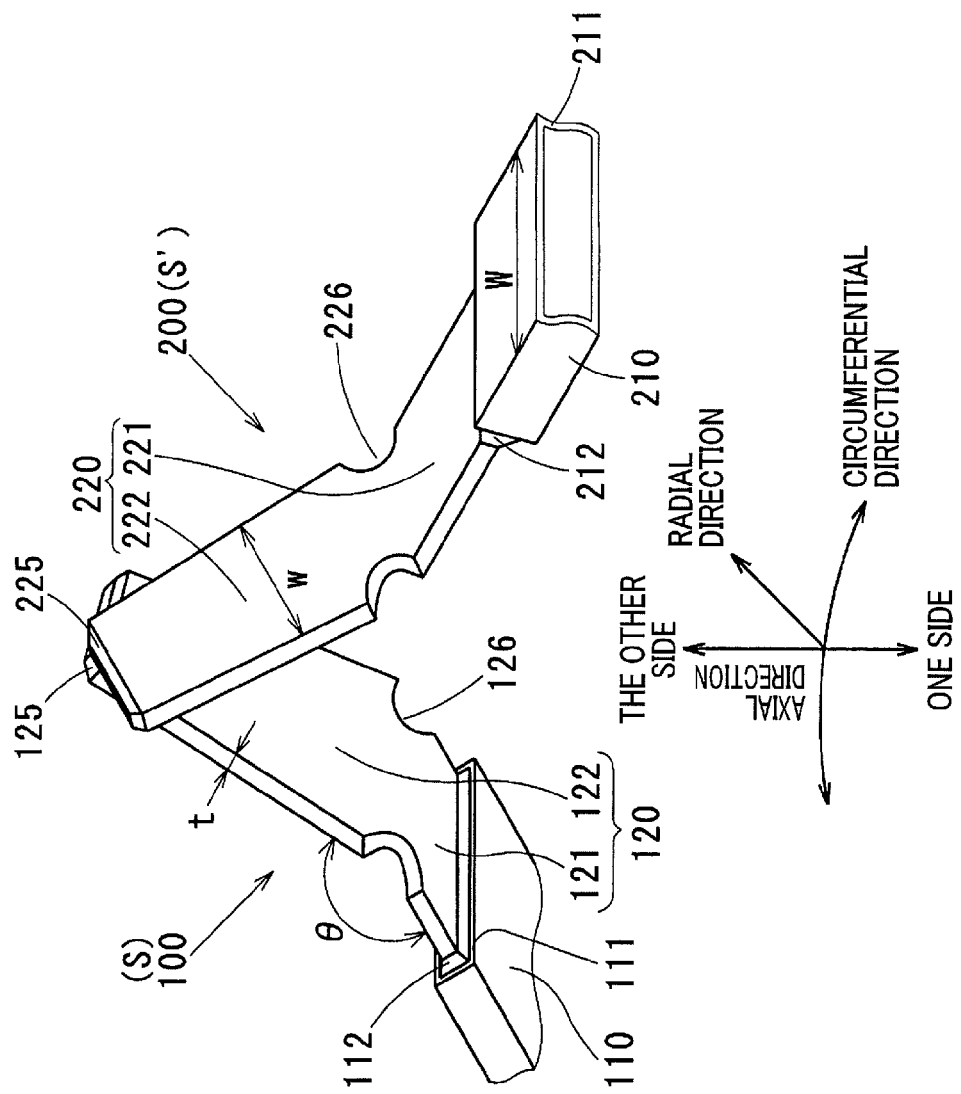
FIG. 7 is illustrating a corresponding pair of the oblique portions of the electric conductor segments according to a second embodiment.
Figure 8A:
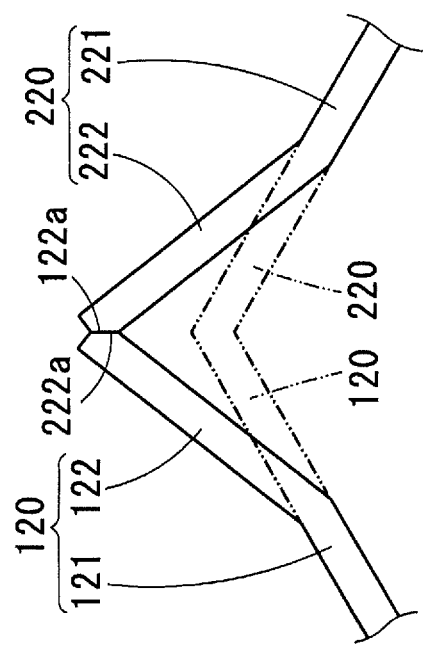
FIG. 8A is a view of a joining region between the corresponding pair of the oblique portions of the electric conductor segments according to the second embodiment along a radial direction of the stator core.
Figure 8B:
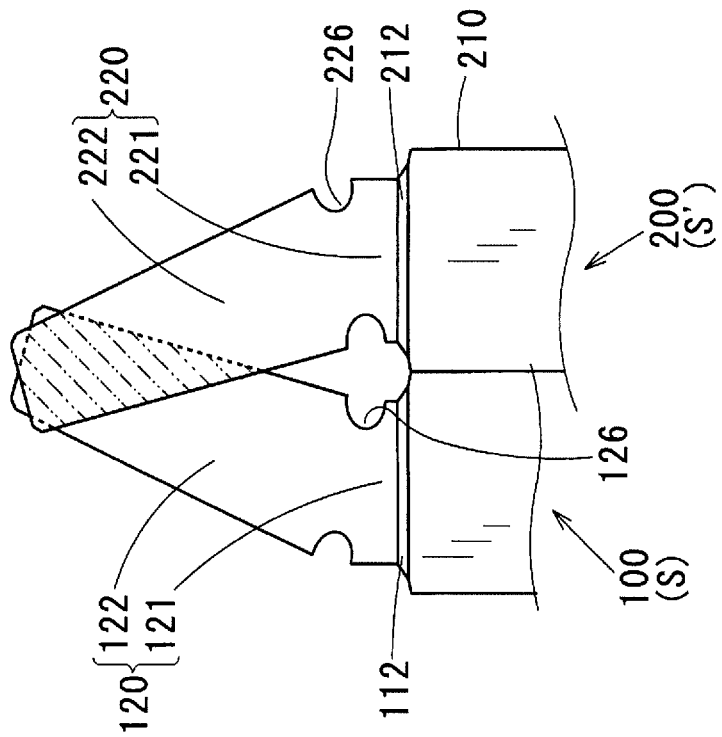
FIG. 8B is a view of the joining region between the corresponding pair of the oblique portions of the electric conductor segments according to the second embodiment along the circumferential direction of the stator core.

FIGS. 7 and 8A-8B illustrate the configuration of the thin sections 120 and 220 of the oblique portions 100 and 200 of the electric conductor segments S and S' according to a second embodiment.

As shown in those figures, in the present embodiment, for each corresponding pair of the oblique portions 100 and 200 of the electric conductor segments S and S', the thin section 120 of the oblique portion 100 has the thickness t over its entire length and includes a first part 121 on the proximal side and a second part 122 on the distal side.

The first part 121 of the thin section 120 is connected to the thick section 110 of the oblique portion 100 via the taper section 112. On the other hand, the second part 122 of the thin section 120 includes the distal end of the oblique portion 100.

Moreover, the first part 121 of the thin section 120 extends obliquely with respect to the axial end face 20a of the stator core 20 at the same oblique angle as the thick section 110 of the oblique portion 100. On the other hand, the second part 122 of the thin section 120 extends obliquely with respect to the axial end face 20a of the stator core 20 at a greater oblique angle than the thick section 110 of the oblique portion 100. Consequently, there is formed an angle θ between the first and second parts 121 and 122 of the thin section 120 of the oblique portion 100.

Similarly, the thin section 220 of the oblique portion 200 has the thickness t over its entire length and includes a first part 221 on the proximal side and a second part 222 on the distal side.

The first part 221 of the thin section 220 is connected to the thick section 210 of the oblique portion 200 via the taper section 212. On the other hand, the second part 222 of the thin section 220 includes the distal end of the oblique portion 200.

Moreover, the first part 221 of the thin section 220 extends obliquely with respect to the axial end face 20a of the stator core 20 at the same oblique angle as the thick section 210 of the oblique portion 200. On the other hand, the second part 222 of the thin section 220 extends obliquely with respect to the axial end face 20a of the stator core 20 at a greater oblique angle than the thick section 210 of the oblique portion 200. Consequently, there is formed an angle θ between the first and second parts 221 and 222 of the thin section 220 of the oblique portion 200.

With the above two-part formation according to the present embodiment, when viewed along the radial direction of the stator core 20, the thin sections 120 and 220 of the oblique portions 100 and 200 together make up the shape of a two-stage ridge as shown with continuous lines in FIG. 8A.

In comparison, with the single-part formation according to the first embodiment, when viewed along the radial direction of the stator core 20, the thin sections 120 and 220 of the oblique portions 100 and 200 together make the shape of a single-stage ridge as shown with two-to chain lines in FIG. 8A.

Consequently, in the present embodiment, the void space defined between the thin sections 120 and 220 of the oblique portions 100 and 200 is increased; the void space can be used as a passage for the cooling air which radially passes the first coil end group 30a. As a result, it becomes easier for the cooling air to pass through the first coil end group 30a; in other words, the resistance of the first coil end group 30a to the flow of the cooling air is lowered.

In addition, it should be noted that the second parts 122 and 222 of the thin sections 120 and 220 in the present embodiment extend obliquely with respect to the axial end face 20a of the stator core 20, and are therefore different from the axially-extending sections in the stator disclosed in Japanese Unexamined Patent Application Publication No. 2000-350422.

Moreover, in the present embodiment, in joining each corresponding pair of the oblique portions 100 and 200 of the electric conductor segments S and S', the second parts 122 and 222 of the thin sections 120 and 220 of the oblique portions 100 and 200 are radially inclined across each other so that: distal end portions of the second parts 122 and 222 overlap each other in the circumferential direction of the stator core 20 as shown in FIG. 8B; and an oblique side face 122a of the second part 122 and an oblique side face 222a of the second part 222 are brought into contact with each other in the circumferential direction as shown in FIG. 8A. In particular, in the present embodiment, each of the second parts 122 and 222 of the thin sections 120 and 220 of the oblique portions 100 and 200 is tapered so as to have its width gradually decreased toward the distal end. Consequently, the second parts 122 and 222 of the thin sections 120 and 220 together make up the shape of a spire with corners of the distal end portions of the second parts 122 and 222 protruding from one another at the overlapping area between the distal end portions. Then, the second parts 122 and 222 of the thin sections 120 and 220 are welded at the overlapping area between the distal end portions thereof.

Furthermore, in the present embodiment, as shown in FIG. 8B, the thin section 120 of the oblique portion 100 has a constriction (or neck part) 126 that is formed at the boundary between the first and second parts 121 and 122 of the thin section 120 and recessed inward in the width direction of the thin section 120. Similarly, the thin section 220 of the oblique portion 200 has a constriction (or neck part) 226 that is formed at the boundary between the first and second parts 221 and 222 of the thin section 220 and recessed inward in the width direction of the section 220. Consequently, with the constrictions 126 and 226, the thin sections 120 and 220 of the oblique portions 100 and 200 can be easily radially bent and thereby inclined toward each other during the process of joining the oblique portions 100 and 200.

In addition, the second part 122 of the thin section 120 of the oblique portion 100 has a chamfer 125 formed at its distal end. Similarly, the second part 222 of the thin section 220 of the oblique portion 200 has a chamfer 225 formed at its distal end.

According to the present embodiment, it is possible to achieve the same advantageous effects as achievable according to the first embodiment.

Moreover, in the present embodiment, for each of the oblique portions 100 and 200 of the electric conductor segments S and S', the thin section 120 or 220 of the oblique portion includes the first part 121 or 221 connected to the thick section 110 or 210 of the oblique portion and the second part 122 or 222 that includes the distal end of the oblique portion. Each corresponding pair of the oblique portions 100 and 200 of the electric conductor segments S and S' are connected by joining the second parts 122 and 222 of the thin sections 120 and 220 of the oblique portions 100 and 200.

With the above configuration, it is possible to adjust the joining area (i.e., the hatched area in FIG. 8B) between the thin sections 120 and 220 of the oblique portions 100 and 200 by radially bending and thereby inclining only the second parts 122 and 222 of the thin sections 120 and 220 across each other.

Further, in the present embodiment, for each of the thin sections 120 and 220 of the oblique portions 100 and 200 of the electric conductor segments S and S', the first and second parts 121 and 122 or 221 and 222 of the thin section extend obliquely at different oblique angles with respect to the axial end face 20a of the stator core 20 so that there is the angle δ formed between the first and second parts.

With the above configuration, it is possible to adjust the joining area between the thin sections 120 and 220 of the oblique portions 100 and 200 and the axial height of the oblique portions 100 and 200 by adjusting the angle θ. Consequently, it is possible to adjust the joining strength between the oblique portions 100 and 200 of the electric conductor segments S and S' and the axial height of the first coil end group 30a of the stator coil 30.

In the present embodiment, for each corresponding pair of the oblique portions 100 and 200 of the electric conductor segments S and S', the second parts 122 and 222 of the thin sections 120 and 220 of the oblique portions 100 and 200 are radially inclined across each other to have their respective distal end portions overlapping each other in the circumferential direction of the stator core 20. The second parts 122 and 222 of the thin sections 120 and 220 are joined at the overlapping area between the distal end portions thereof.

With the above configuration, it is possible to adjust the joining area between the thin sections 120 and 220 of the oblique portions 100 and 200 and the axial height of the oblique portions 100 and 200 by adjusting the inclination angles of the second parts 122 and 222 of the thin sections 120 and 220.

In the present embodiment, for each of the oblique portions 100 and 200 of the electric conductor segments S and S', the thin section 120 or 220 of the oblique portion further has the constriction 126 or 226 that is formed at the boundary between the first and second parts 121 and 122 or 221 and 222 of the thin section and recessed inward in the width direction of the thin section.

With the constrictions 126 and 226, it is possible to easily bend the thin sections 120 and 220 of the oblique portions 100 and 200 and thereby radially incline the second parts 122 and 222 of the thin sections 120 and 220 toward each other during the process of joining the oblique portions 100 and 200.

In the present embodiment, each of the second parts 122 and 222 of the thin sections 120 and 220 of the oblique portions 100 and 200 is tapered so as to have its width gradually decreased toward the distal end. Further, at the overlapping area between the distal end portions, the second parts 122 and 222 of the thin sections 120 and 220 make up the shape of a spire with the corners of the distal end portions of the second parts 122 and 222 protruding from one another.

With the above configuration, a welding arc can be easily created during the process of welding each corresponding pair of the oblique portions 100 and 200 of the electric conductor segments S and S'.

While the above particular embodiments have been shown and described, it will be understood by those skilled in the art that various modifications, changes, and improvements may be made without departing from the spirit of the present invention.

For example, in the second embodiment, for each of the oblique portions 100 and 200 of the electric conductor segments S and S', the thin section 120 or 220 of the oblique portion has the constriction 126 or 226 recessed inward in the width direction of the thin section, thereby facilitating the bending of the thin section in the width direction (or the radial direction of the stator core 20).

However, the thin section of the oblique portion may have, instead of or in addition to the constriction 126 or 226, a constriction that is recessed inward in the thickness direction of the thin section, thereby facilitating the bending of the thin section in the thickness direction.

Moreover, in the second embodiment, for each corresponding pair of the oblique portions 100 and 200 of the electric conductor segments S and S', the second parts 122 and 222 of the thin sections 120 and 220 of the oblique portions 100 and 200 are radially inclined across each other to have their respective distal end portions overlapping each other in the circumferential direction of the stator core 20.

However, as in the first embodiment, the second parts 122 and 222 of the thin sections 120 and 220 of the oblique portions 100 and 200 may have their respective side faces in contact with each other with or without being radially inclined toward each other; the side faces respectively define the thicknesses of the second parts 122 and 222 of the thin sections 120 and 220 and face each other in the radial direction of the stator core 20.

In the previous embodiments, for each of the oblique portions 100 and 200 of the electric conductor segments S and S', the taper section 112 or 212 of the oblique portion is tapered on all of four sides so that both the thickness and width of the taper section are gradually decreased from the thick section to the thin section.

However, the taper section may be tapered on only one or two sides so that only one of the thickness and width of the taper section is gradually decreased from the thick section to the thin section.

In the previous embodiments, in each of the slots 21 of the stator core 20, there are received four in-slot portions of the electric conductor segments (or electric conductors S1-S4).

However, depending on the number of phases of the stator coil 30 and the manner of winding the stator coil 30, the number of the in-slot portions of the electric conductor segments received in each of the slots 21 of the stator core 20 may be set to other numbers than four.

In the previous embodiments, each of the electric conductor segments is substantially U-shaped to include a pair of in-slot portions, one turn portion on one axial side of the in-slot portions, and a pair of oblique portions on the other axial side of the in-slot portions.

However, each of the electric conductor segments may be modified to include at least one in-slot portion and at least one oblique portion. For example, each of the electric conductor segments may be substantially I-shaped to include one in-slot portion and a pair of oblique portions respectively on opposite axial sides of the in-slot portion.

In the previous embodiments, the present invention is applied to the stator 2 for the automotive alternator 1. However, the invention can also be applied to stators for other electric rotating machines, such as an electric motor or a motor-generator that can selectively function either as an electric motor or as an electric generator.

What is claimed is:

1. A stator for a rotating electric machine, the stator comprising:
    an annular stator core having a plurality of slots formed therein, the slots being spaced from one another in a circumferential direction of the stator core; and
    a stator coil mounted on the stator core,
    wherein
    the stator coil is formed of a plurality of electric conductor segments each of which has a substantially rectangular cross section with its width greater than its thickness,
    each of the electric conductor segments is bent in its thickness direction to include, at least, an in-slot portion and an oblique portion, the in-slot portion is received in a corresponding one of the slots of the stator core with the width direction of the in-slot portion coinciding with a radial direction of the stator core, the oblique portion protrudes from the in-slot portion outside the corresponding slot and extends, over its entire length, along the circumferential direction of the stator core obliquely with respect to an axial end face of the stator core, the oblique portion includes a thick section and a thin section, the thick section has one end connected to the in-slot portion and the other end connected to the thin section, the thick section having substantially the same thickness as the in-slot portion, the thin section has one end connected to the thick section and the other end defining a distal end of the oblique portion, the thin section having a thickness less than the thickness of the thick section, each corresponding pair of the oblique portions of the electric conductor segments are connected by joining the thin sections of the oblique portions, for each of the oblique portions of the electric conductor segments, the thin section of the oblique portion includes a first part connected to the thick section of the oblique portion and a second part that includes the distal end of the oblique portion, each corresponding pair of the oblique portions of the electric conductor segments are connected by joining the second parts of the thin sections of the oblique portions, and for each of the oblique portions of the electric conductor segments, the thin section of the oblique portion further has a constriction that is formed at the boundary between the first and second parts of the thin section and recessed inward in one of the width and thickness directions of the thin section.

2. The stator as set forth in claim 1, wherein each of the oblique portions of the electric conductor segments further includes a taper section that is formed between the thick and thin sections so as to taper from the thick section to the thin section.

3. The stator as set forth in claim 1, wherein for each of the thin sections of the oblique portions of the electric conductor segments, the first and second parts of the thin section extend obliquely at different oblique angles with respect to the axial end face of the stator core so that there is an angle formed between the first and second parts.

4. The stator as set forth in claim 1, wherein for each corresponding pair of the oblique portions of the electric conductor segments, the second parts of the thin sections of the oblique portions are radially inclined across each other to have their respective distal end portions overlapping each other in the circumferential direction of the stator core, and the second parts of the thin sections are joined at the overlapping area between the distal end portions thereof.

5. The stator as set forth in claim 1, wherein for each of the oblique portions of the electric conductor segments, the thick section of the oblique portion is covered with an insulating material, and the thin section of the oblique portion has no insulating material covering it.

* * * * *